March 7, 1944.    S. H. M. DODINGTON    2,343,285
RECTIFIER
Filed Aug. 26, 1942

INVENTOR
SVEN H. M. DODINGTON
BY Percy P. Lantry
ATTORNEY

Patented Mar. 7, 1944

2,343,285

UNITED STATES PATENT OFFICE 2,343,285

RECTIFIER

Sven H. M. Dodington, Forest Hills, N. Y., assignor to Federal Telephone and Radio Corporation, a corporation of Delaware Application August 26, 1942, Serial No. 456,219

5 Claims. (Cl. 175—363)

This invention relates to rectifiers and an object of this invention is to provide rectifier means having an alternating current input and two direct current outputs, one output to provide low or medium voltage and high current, and the second output to provide high voltage and low current.

Briefly, my invention compises as a part thereof, a known full wave rectifier circuit by which I provide from an alternating current source direct current at a low or medium voltage, as may be desired. From either of the transformer secondary winding connections to the anodes of the full wave rectifier, I obtain an alternating voltage which is superimposed on the voltage from the direct current output and I apply the resultant voltage thereof to the anode of a diode peak rectifier tube. The latter tube operates so as to charge a condenser in its cathode output circuit to a voltage nearly equal to the positive peak voltage applied to its anode. In operation, the tube and the circuit associated therewith substantially maintain this high voltage as a constant direct current voltage which may be used, for example, in supplying the anodes of a cathode ray tube.

Figure 1:
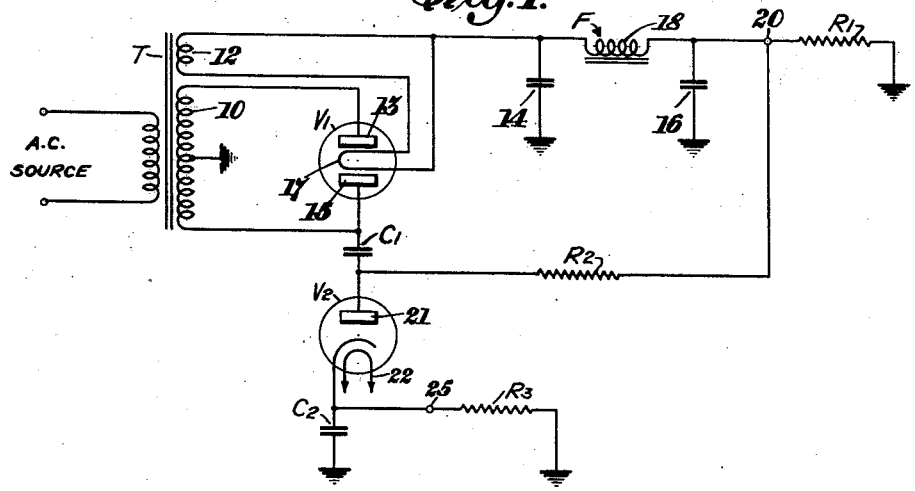
Figure 2:
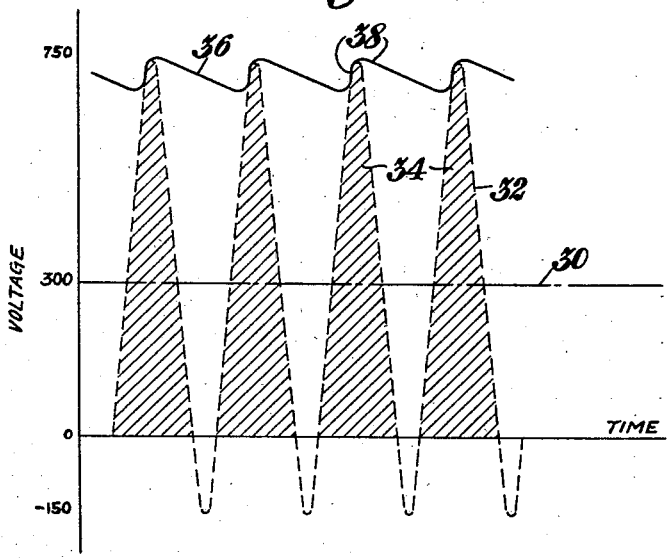

For a better understanding of my invention, reference may be had to the following detailed description to be read in connection with the accompanying drawing, in which, Fig. 1 is a schematic circuit diagram in accordance with my invention; and Fig. 2 is a graphic illustration showing the voltage output relations of the circuit.

Referring to Fig. 1 of the drawing, the diagram shows a transformer T supplied by an alternating current source. The secondary of the transformer comprises a main winding 10, grounded at its midpoint, and a filament winding 12, the two windings being connected respectively to the anodes 13 and 15 and the filament 17 of a full wave rectifier tube V1. The output from the filament winding is connected to a filter circuit F comprising condensers 14 and 16 and an inductance 18, and then to an output terminal 20 to which a load R1 may be connected.

A peak rectifier tube V2 has its anode 21 connected by a resistor R2 to the direct current output terminal 20 and also by a capacitance C1 to one end of the main secondary transformer winding 10. The filament winding 22 of the tube V2 either may be supplied independently or from the source supplying the filament of the tube V1. The cathode of the tube V2 is connected to a condenser C2 and a load resistance R3 which are arranged in parallel.

In operation, the secondary windings of the transformer T supplies a peak voltage, for example, of about 450 volts to the anodes 13 and 15, and a root mean square voltage of about 5 volts to the filament 17 of the full wave rectifier tube V1. The tube V1 may comprises two single anode tubes or as indicated a double anode tube, for example, that known as a "5Z3" rectifier. Pulsating direct current from the filament 17 is passed through the filter F to smooth out the pulsations and then to the output terminal 20 for supplying direct current, for example, in the order of 300 volts. The resistance R1 which represents a load is shown connected to this output terminal. This load resistance for purposes of illustration may be of the order of 2000 ohms, and for example, may represent an amplifier load required to amplify deflection voltages in connection with a cathode ray tube.

The peak rectifier tube V2, which may be of the "6X5" type, has its anode connected to two sources. The anode is first connected through the resistance R2 to the rectified direct current output 20 and second through the capacitance C1 to a high voltage point on the main secondary winding of the transformer T. Compared to R1, the resistance of R2 is large and may be in the order of 250,000 ohms. C1 may be small, say, about 0.5 microfarads. The resistance R2 may be connected either ahead or beyond the filter F. If connected ahead of the filter F, a pulsating direct current is fed to the tube V2 and if connected beyond the filter as shown a substantially constant direct current is fed to the tube.

The anode of tube V2 will have, neglecting voltage drops in the connecting means, a direct current value of about 300 volts on which will be superimposed an alternating current peak voltage of about 450 volts through the condenser C1. It will be readily appreciated that the resultant voltage above ground will then vary from a positive value of about 750 volts to a negative value of about 150 volts. Characteristic of peak rectifiers the tube V2 will only function during the positive portions of the cycle and will be inoperative during the negative portions of the cycle thereby producing a pulsating direct current output.

In Fig. 2 the broken line 30 represents the constant voltage at the direct current output 20 and also the direct current voltage applied to anode 21 of tube V2. The curve 32 represents the voltage of the alternating current source as applied to the anode 21.

During the positive portion of any cycle the tube V2 will be conductive and the condenser C2, which is large compared to C1, will be charged by a voltage nearly equal to 750 volts. During the negative part of the cycle, when the anode of tube V2 becomes negative, the tube V2 will be inoperative and the condenser C2 will commence to discharge. It is thus readily apparent that the tube V2 has a pulsating direct current output representable by the shaded areas 34 (Fig. 2). The load resistance R3 which may represent the anodes of a cathode ray tube, however, is very large, for example, in the order of 5 megohms, so that the charge on the condenser C2 will leak off very slowly as indicated by the slope 36 of the curve 38. Before the charge can leak off appreciably the positive peak of the next cycle of the alternating current 32 will again restore the former voltage charge on the condenser C2. This results in a substantially constant high direct current voltage at the output terminal 25 for the tube V2 as indicated by the curve 38. In practice, I have found that with the embodiment above described and using values as indicated, an average potential of approximately 700 volts may be obtained from the cathode of the tube V2.

My invention is particularly advantageous, for example, where high voltage and low current are needed in addition to an existing medium voltage-high current supply as in a cathode ray oscilloscope. Deflection voltages for an oscilloscope are amplified in circuits using high current, say about 100 milliamperes, at voltages of about 300 volts. According to my invention, such a voltage is available from the filtered output 20 of the full wave rectifier. Cathode ray tube anode voltages are relatively high, for example, about 600 volts, the current being low, about 0.1 of a milliampere. According to my invention, such high voltage and low current are available at the output terminal 25 of the peak rectifier V2.

Although I have described my invention and cited particular values of elements in a preferred circuit for a particular application, it is to be understood that many modifications, additions and omissions may be made within its scope as defined by the appended claims.

What I claim is:

1. Rectifier means comprising a first rectifier connected to a source of alternating current to provide a first direct current output, and a second rectifier including a diode peak rectifier tube connected to one side of said alternating current source and to said first direct current output to provide a second direct current output at a voltage higher than the voltage of said first direct current output.

2. Rectifier means comprising a full wave rectifier connected to a source of alternating current to provide a first direct current output, and a second rectifier including a diode peak rectifier tube connected to one side of said alternating current source and to said first direct current output to provide a second direct current output at a voltage higher than the voltage of said first direct current output.

3. Rectifier means comprising a first rectifier connected to a source of alternating current to provide a first direct current output having a given voltage, a filter to smooth out pulsations in the voltage of said direct current output, a second rectifier, a condenser, a resistance, means connecting the input of the second rectifier through said condenser to said alternating current source and through said resistance to the output of said filter, and said second rectifier having a direct current output at a voltage equal to approximately the sum of the voltages of said alternating current source and said first direct current output.

4. Rectifier means comprising a rectifier connected to a source of alternating current to provide a first direct current output, a diode peak rectifier tube, means connecting the anode of said tube to said alternating current source and to said first direct current output, a condenser, a resistance, said condenser and said resistance being connected in circuit to the output of said tube to smooth the direct current pulses passed by said tube thereby providing a substantially constant direct current output.

5. Rectifier means comprising a full wave rectifier connected to a source of alternating current to provide a first direct current output, a diode peak rectifier tube, a condenser, a resistance, the input of said tube being connected through said condenser to said alternating current source and through said resistance to said first direct current output, said tube having an output of direct current pulsations having peak voltages equal to approximately the sum of the voltages of said alternating current source and said first direct current output, a second condenser, a second resistance, and said second condenser and said second resistance being connected to said second output to smooth the direct current pulses passed by said tube.

SVEN H. M. DODINGTON.